Oct. 31, 1950     H. L. BICKLER     2,528,412
VENTILATING BACK REST FOR AUTOMOBILE SEATS
Filed March 20, 1948
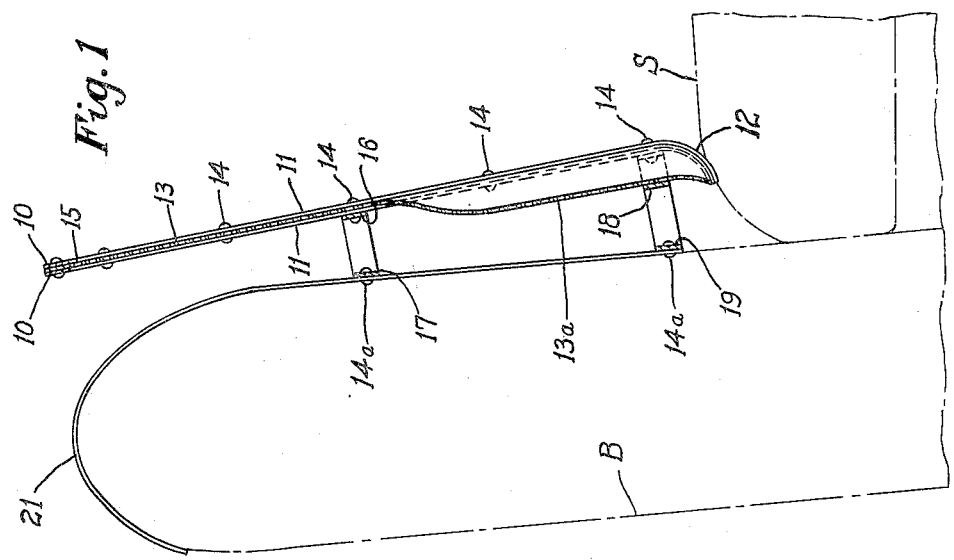
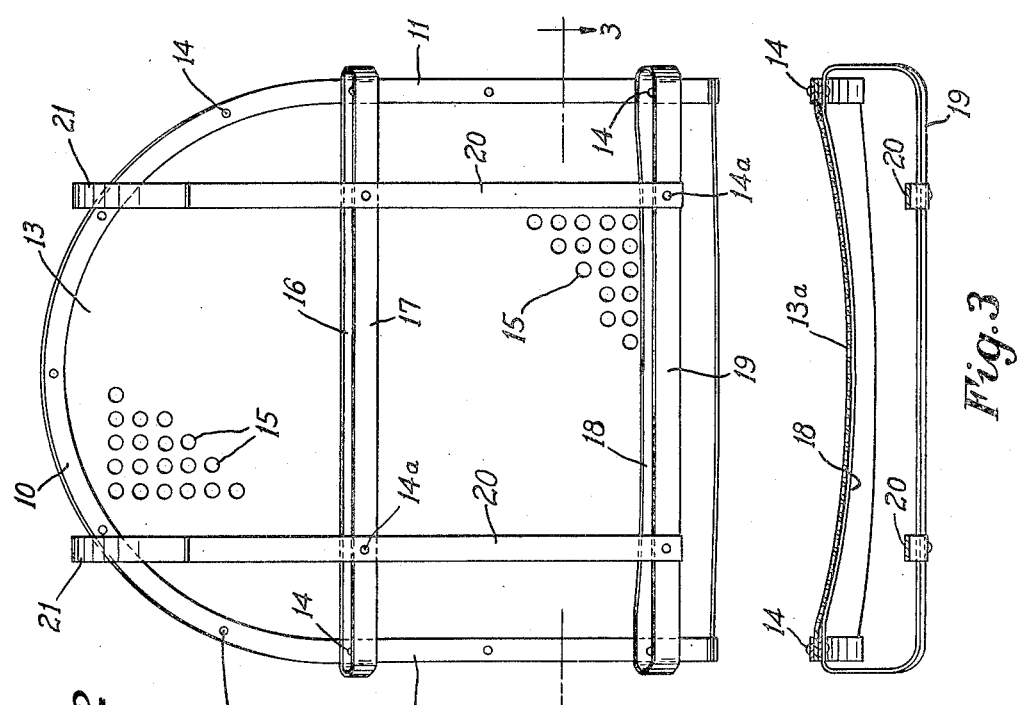
INVENTOR.
Henry L. Bickler
BY
ATTORNEYS Patented Oct. 31, 1950

2,528,412

UNITED STATES PATENT OFFICE 2,528,412

VENTILATING BACK REST FOR AUTOMOBILE SEATS

Henry L. Bickler, Canton, Ohio

Application March 20, 1948, Serial No. 16,063

4 Claims. (Cl. 155—182)

1

The invention relates generally to back rests for chair seats and the like, and more particularly to a novel back support for an automobile seat which promotes ventilation between the support and the back of the seat.

In warm climates or in the warmer seasons of the year, the driver of an automobile frequently has an unpleasant and irritating condition caused by perspiration where his back contacts the back of the automobile seat. This condition is particularly aggravated for the driver because the operation of driving the automobile forces him to keep his back pressed constantly against the back of the seat.

There have been prior ventilating back rests for the automobile driver, but they have had a number of disadvantages; such as being heavy and awkward to handle, expensive to manufacture, having a tendency to move out of position, and providing an uncomfortable and improper support for the driver's back.

It is an object of the present invention to provide a novel and improved ventilating back rest which overcomes all of the foregoing disadvantages.

Another and more specific object is to provide a light weight and inexpensive ventilating back rest which is quickly attached or removed from the automobile seat, and which will stay in proper position thereon.

Another object is to provide a novel ventilating back rest for an automobile seat, which back rest provides a comfortable healthful support for the driver's back, promotes proper posture and reduces fatigue.

These and other objects are accomplished by the parts, constructions, and arrangements which comprise the present invention, the nature of which is set forth in the following general statement and a preferred embodiment of which is set forth in the following description and illustrated in the accompanying drawing, and which is particularly and distinctly pointed out and set forth in the appended claims forming part hereof.

In general terms, the ventilating back rest comprising the present invention includes an inverted U-shaped frame having a perforated back-supporting material extending over the same, a closed loop supporting member extending transversely of the frame intermediate its top and bottom ends for reinforcing the central portion of the back rest, and another closed loop supporting member extending transversely across the back of the frame at the lower portion thereof and being concavely curved at its

2 front side for conforming to the lower part of the driver's back, there being vertical members attached to said loops and having rearwardly hooked portions at their upper ends for fitting over the top of the automobile seat back.

Referring to the drawing in which a preferred embodiment of the invention is shown by way of example;

Figure 1 is a vertical sectional view of the improved ventilating back rest showing the same positioned against the front side of the back of the front seat of an automobile;

Fig. 2 is a detached rear elevational view of the improved back rest; and

Fig. 3 is a plan sectional view as on line 3—3, Fig. 2.

Similar numerals refer to similar parts throughout the several views of the drawing.

The frame of the novel back rest may consist of one or more strips of preferably light weight metal bent into the form of an inverted U. As shown, the frame consists of two strips 10, one on top of and matching the other, each having a semi-circular upper portion and two vertical legs 11 at opposite sides of the frame. As indicated in Fig. 1, the vertical legs 11 are rearwardly curved at their lower ends, as at 12, so as to rest on top of an automobile seat, indicated in dot-dash lines at S, without puncturing the same. The back part of a usual automobile seat is indicated in dot-dash lines at B.

The covering material 13 for the back rests extends between the legs 11 and covers the entire space enclosed by the frame. Preferably, the marginal edges of the covering material 13 extend between the matching strips 10 and are secured thereto by rivets or bolts 14 passing through the covering material and both strips 10, and located at suitable intervals along the frame strips.

The covering material 13 is preferably perforated throughout, in a manner such as indicated by the perforations 15 in Fig. 2, and the material itself may be cane seating material or perforated aluminum sheet or plastic or any other suitable material. As indicated in Figs. 1 and 3, the lower portion 13a of the covering 13 is inwardly curved or concaved to conform to and properly support the lower portion of the driver's back when he is seated on the automobile seat S.

A reinforcing member is preferably provided substantially midway between the top and bottom of the frame, and extends transversely between the legs 11 thereof, being attached to the strips 10 on the back of the frame. This reinforcing member may be made in the form of a closed loop having a front strip 16 secured by rivets or bolts 14 to the frame strips 10, and having a rear strip 17 parallel with the front strip and spaced a short distance rearwardly thereof.

A bottom reinforcing member is provided extending across the back side of the lower portion of the frame 10, and this member may also be in the form of a closed loop having a front concave strip 18 secured to the legs 11 of the frame by rivets or bolts 14, and having a rear strip 19 spaced rearwardly thereof. As clearly shown in the drawings, the front strip 18 of the lower support is inwardly curved or concaved in a manner to conform to the lower curved portion 13a of the covering 13 so as to maintain the covering in its proper concave condition for supporting the lower part of the driver's back.

The means for quickly attaching or removing the novel ventilating back rest to or from the back of the front seat of an automobile preferably includes two vertical strips 20 which are attached by rivets or bolts 14a to the back strips 17 and 19 of the upper and lower reinforcing members, respectively. These vertical strips 20 are spaced apart laterally as shown, and extend upwardly from the upper reinforcing member and then curve rearwardly and downwardly to form the downwardly open hook portions 21 at the tops of the vertical strips. The dimensional characteristics of the hook portions 21 are such that they will fit over the top of the back seat of an automobile rather snugly and can be easily removed therefrom merely by lifting upwardly on the back rest.

Accordingly, the hooks 21 provide means for detachably mounting the back rest on the back of the front seat of an automobile and maintaining the rest in that position as long as desired. The spacing between the front and back strips 16 and 17 of the upper reinforcing member, and between the front and back strips 18 and 19 of the lower reinforcing member is such as to position the back rest a short yet substantial distance in front of the back of the automobile seat S so as to promote ventilation between the seat back B and the driver's back when he is leaning against the back rest. The reinforcing members and the vertical strips 20 may all be made of light weight material such as aluminum, so that the weight of the entire weight of the back rest is kept at a minimum for promoting ease and convenience in handling.

In addition to the comfort provided by the ventilation between the back rest and the automobile seat back, the inwardly curved portion 13a of the back rest covering 13, being firmly supported by the inwardly curved or concave strip 18 of the bottom reinforcing member, provides a proper and restful back support for the driver which not only adds to its comfort, but also promotes proper posture and consequently materially reduces fatigue.

In other words, the support provided by the novel back rest for the lower part of the driver's back prevents a slumping position of the waist and hips which ordinarily takes place as the driver sinks into the resilient seat of an automobile, with the result that in long driving periods, the rack rest has a restful effect, in contrast to the usual tired condition caused by the said slumping posture.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use, and a preferred embodiment thereof, and the advantageous new and useful results obtained thereby; the new and useful constructions, and reasonable mechanical equivalents thereof obvious to those skilled in the art, are set forth in the appended claims.

I claim:

1. A ventilating back rest for an automobile seat including an inverted U-shaped frame, a perforated covering secured to and extending across the frame, upper and lower reinforcing members secured to and extending transversely across the rear side of the frame, said reinforcing members having spaced apart front and rear strips for spacing the frame from said automobile seat, said lower reinforcing member having a concavely curved front strip for supporting the lower portion of said covering in concave form suitable for conforming to and supporting the lower part of the driver's back, and vertical strips secured to the rear strips of said reinforcing members and having hooks at their upper ends for engaging over the automobile seat back.

2. A ventilating back rest for an automobile seat including an inverted U-shaped frame, a substantially rigid perforated covering secured to and extending across the frame, a reinforcing member secured to and extending transversely across the rear side of the lower portion of the frame, said member having a rearwardly spaced rear strip for spacing the frame from said automobile seat and having a front concavely curved strip for supporting the lower portion of said covering in concave form conforming to the lower part of the driver's back, and laterally spaced vertical strips secured to said rear strip and having hooks at their upper ends for engaging over the seat back of the automobile.

3. A ventilating back rest for an automobile seat including a frame, a perforated covering on said frame and having a concave lower portion, upper and lower closed loop reinforcing members secured to and extending transversely across the rear side of the frame, said reinforcing members having spaced apart front and rear strips for spacing the frame from said automobile seat, said lower reinforcing member having a concavely curved front strip for supporting the lower portion of said covering in concave form suitable for conforming to and supporting the lower part of the driver's back, and vertical strips secured to the rear strips of said reinforcing members and having hooks at their upper ends for engaging over the automobile seat back.

4. A ventilating back rest for an automobile seat including a frame, a substantially rigid perforated covering on said frame and having a concave lower portion, a reinforcing member secured to and extending transversely across the rear side of the lower portion of the frame, said member having a rearwardly spaced rear strip for spacing the frame from said automobile seat and having a front concavely curved strip for supporting the lower portion of said covering in concave form conforming to the lower part of the driver's back, and laterally spaced vertical strips secured to said rear strip and having hooks at their upper ends for engaging over the seat back of the automobile.

HENRY L. BICKLER.

REFERENCES CITED

The following references are of record in the file of this patent:

UNITED STATES PATENTS

| Number | Name | Date |
|---|---|---|
| 1,208,121 | Fitzgerald | Dec. 12, 1916 |
| 1,356,493 | Kerr | Oct. 19, 1920 |
| 1,734,144 | Morin | Nov. 5, 1929 |
| 1,917,264 | Kellogg | July 11, 1933 |